Sept. 16, 1969
A. DIXON
3,467,806
INDUCTION HEATING DEVICE
Filed April 25, 1968
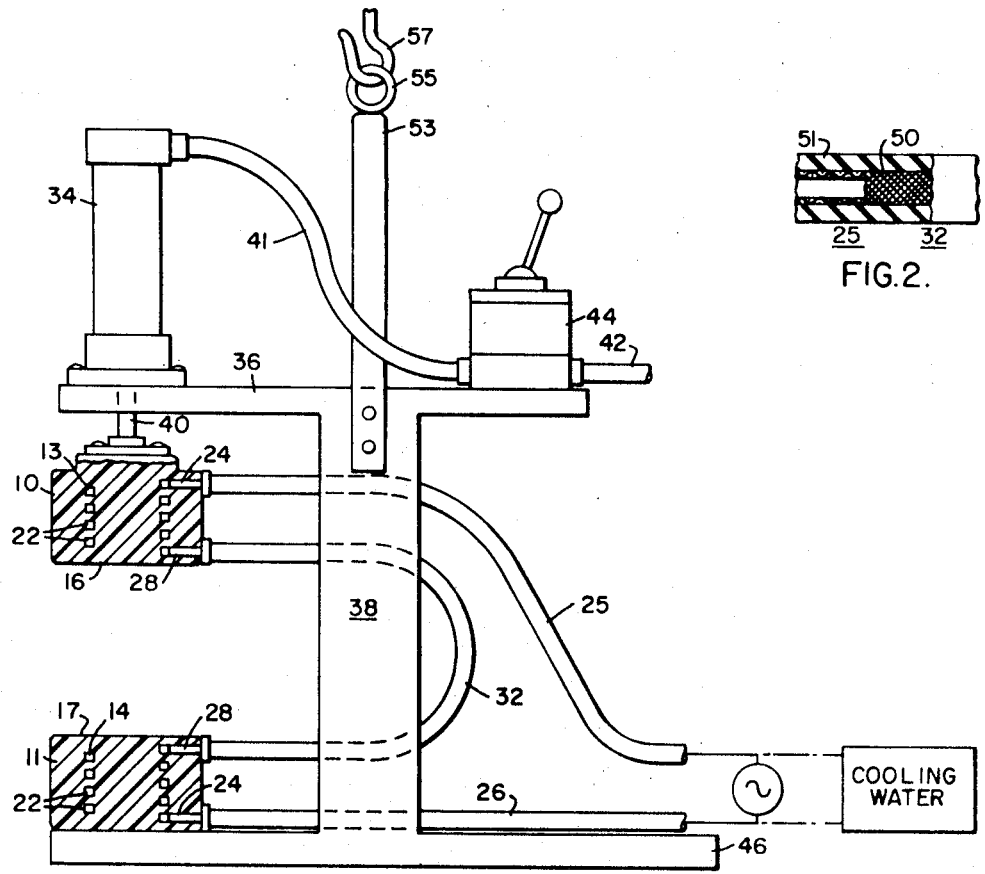
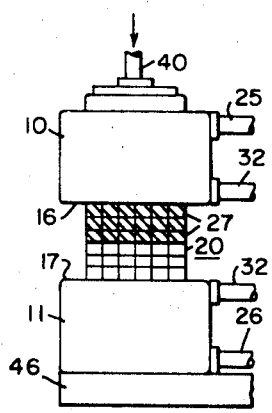
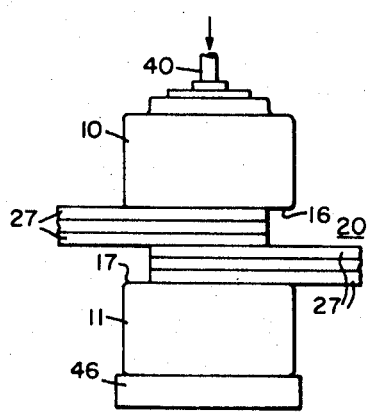
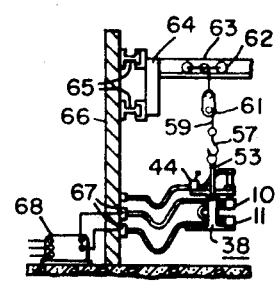
WITNESSES:
Bernard R. Gagnay
James T. Young
INVENTOR
Austin Dixon
D. T. Stratieff
AGENT

United States Patent Office 3,467,806
Patented Sept. 16, 1969

3,467,806
INDUCTION HEATING DEVICE
Austin Dixon, Manor, Pa., assignor to Westinghouse Electric Corporation, Pittsburgh, Pa., a corporation of Pennsylvania
Filed Apr. 25, 1968, Ser. No. 724,060
Int. Cl. H05b 5/00
U.S. Cl. 219—10.73                7 Claims

ABSTRACT OF THE DISCLOSURE

An upper retractable heat and pressure applicator member is movable by a reversible vertical pneumatic actuator cylinder into engagement with the upper layer of a laminate workpiece joint supported beneath by a lower heat and pressure applicator member. A portable frame rigidly connects the lower heat and pressure applicator member with the actuator cylinder above. The two heat and pressure applicator members include water-cooled series-connected similarly wound elongated vertically extending multi-turn induction heating coils embedded in blocks of insulating material. Flexible tubing including multi-strand conductors provide for flow of high frequency energizing current and cooling water to and from the upper heating coil.

BACKGROUND OF THE INVENTION

Field of the invention

Induction heating and force applying apparatus for laminate workpiece assemblies.

Description of the prior art

Previous known apparatus for effecting induction heating and clamping of overlapping workpiece assemblies which employ movable series-connected induction heating coil means disposable at opposite sides of such assemblies have been characterized by a lack of cooperative unification of the means employed to perform the several functions of the heating and force applying, as well as by a lack of capability for repetitive use on a continuous basis as an efficient general purpose and/or portable production tool capable of accommodating a significant range of laminate workpiece assembly thicknesses. Representative of such prior art apparatuses are those disclosed in the March 1958 issue of The Tool Engineer in an article entitled "Induction Heating-Portable Units Increase Utility," and U.S. patent to Brennan 2,777,929 on a welding apparatus, for example.

SUMMARY OF THE INVENTION

In accord with features of the present invention, by providing series-connected multi-turn induction coils wound in the same direction for disposition of their end turns parallel and adjacent to opposite flat sides of a laminate workpiece assemblage, the magnetic flux field created by energization of one coil assists that of the other to afford a capability for effectively inducing heating currents in workpiece assemblages of considerable range in thicknesses. By the incorporation of such coils in insulated pressure blocks, clamping of the workpiece assemblage is united with introduction of the coils to such assemblage. By the inclusion of multi-strand flexible leads for the movable induction coil, a capability for repetitive movement of such coil over a relatively wide range of distance to accommodate a range of workpiece assembly thicknesses is afforded without concern for failure of such leads. By the inclusion of a pneumatic cylinder for actuating the movable coil-and-pressure block, and of a portable frame reactively interconnecting such cylinder with the other coil-and-pressure block, immediate capability is provided for clamping the workpiece assemblage, for introducing the heating coils thereto, and for sustaining such force during heating at any locale to which such device may be transported by such as traveling crane means. Source lines along one path of crane travel provide for cooling water, pneumatic, and high frequency electrical supply to the device at different locales.

FIG. 1 is a side elevation view of an induction heating device constructed in accordance with the present invention;

FIG. 2 is a fragmental view of a flexible, water-conveying electrical lead suitable for employment in the device of FIG. 1;

FIGS. 3 and 4 are side and front elevation views, respectively, of a portion of the device of FIG. 1 in clamping and heating association with a typical relatively thick laminate workpiece assemblage to be heated as for brazing; and FIG. 5 is a side elevation view of the device of FIG. 1 as including an overhead traveling crane supporting the frame of the device for position-adjusting movement with three degrees of freedom.

DESCRIPTION OF THE PREFERRED EMBODIMENT

Referring to FIG. 1, features of the invention include a heating and clamping means consisting of a pair of squeeze-force applicator members 10 and 11 of electrical and heat insulating material, such as asbestos and a binder, in which are embedded a pair of series-connected similarly-wound, multi-turn induction heating coils 13 and 14 respectively. The members 10 and 11 are preferably block-shaped with flat rectangular end faces 16 and 17, respectively, and aligned vertically with face 16 disposed above and parallel to face 17 to deliver a distributed vertical clamping force to a horizontally-extending laminate workpiece assemblage having flat top and bottom surfaces, such as workpiece assemblage 20 in FIGS. 3 and 4, when one of the members 10 and 11 is urged toward the other. The separation distance between the faces 16 and 17 when the members 10 and 11 are in fully retracted repose positions should be at least several inches to accommodate heating of a wide range of thicknesses of laminate workpiece assemblies, such as power transformer lead groups of copper and/or aluminum to be brazed together or to a bus bar, for example, which may vary from a fraction of an inch to an inch or more.

Each of the induction heating coils 13 and 14 comprises a number of turns 22, at least three or more, four-and-one-half turns being exemplified in FIG. 1, preferably rectangular in cross-section and wound from hollow copper tubing, which also may be rectangular in cross section, to accommodate the usual circulation of cooling water. Similar coils of one-quarter by three-eighths inch rectangular copper tubing wound into six turns in a rectangular array two and one-half inches by one and one-half inches in inside cross section by two inches long has been found adequate for full-width heating of up to three-inch-wide laminate workpiece assemblages 20 of copper transformer lead groups for brazing. Wider groups can be accommodated by repositioning of the workpiece assemblage to heat widthwise sections consecutively, or the coil dimensions may be increased to span greater widths for full-width single-heat brazing.

Each of the coils 13 and 14 has on end terminal 24 for connection to a respective side of a source of cooling water and of a source of high frequency electrical energy via hollow leads 25 and 26. A 10 kHz. source with a power output capability of at least one hundred kilowatts, and cooling water source of up to about five gallons per minute, has been found adequate for use of the exemplified coils in heating copper transformer lead assemblages up to three inches wide and one inch thick to brazing temperatures of 1000° F. to 1500° F. in less than sixty seconds at about three hundred volts across the coils and two hundred fifty amperes. It has been found that the apparatus is particularly useful for such brazing where the several workpiece layers are composed of a row of separated conductor strips 27, which apparently affords a capability for the magnetic flux lines between the two coils to penetrate such layers and contribute to a substantial uniformity of eddy current heating throughout the thickness of such type of assemblage, without relying on heat conduction to establish such uniformity. Assemblies of six of such layers have been successfully heated and brazed by the present device. This is particularly significant in heating aluminum workpieces, where often the brazing alloy material between layers has a melting point close to that of the workpiece parts themselves, and it becomes desirable not to establish excessive temperature differences which may provoke localized melting of such workpiece parts in effort to encourage heat migration by thermal conduction.

The opposite end turn of each coil lies adjacent and parallel to the end faces 16 and 17 of members 10 and 11, respectively, and has respective terminals 28 which are interconnected via a flexible hollow lead 32, whereby the series connection of the two coils 13 and 14 results. Such particular series connection, coupled with the correspondence of winding direction of the two coils, results in the two coils assisting one another in the creation of a strong electromagnetic flux field between them throughout a wide range of separation distances, and in a direction which is perpendicular to the workpiece contact faces of the member 10 and 11, so that flat laminate workpiece assemblages clamped therebetween experience such flux in their thickness-wise direction, which appears to contribute to the success that has been realized in use of the present device in heating such assemblages of various thicknesses.

Aa pneumatic cylinder 34 provides for retraction and relative actuation of the members 10 and 11 into clamping engagement with the laminate workpiece assemblages 20 while affording capability of maintaining a clamping force even during considerable reduction in thickness of the workpiece assemblage which occurs, for example, when brazing alloy members (not shown) between the workpiece layers flow after they become melted during the heating of the workpiece. Preferably, as depicted in FIG. 1, the pneumatic cylinder is secured in a vertical attitude to an upper horizontal part 36 of a rigid frame 38 and carries the member 10 and the coil 13 embedded therein on the lower end of its piston rod 40 for direct actuation. A piston return spring (not shown) returns the piston (not shown), piston rod 40 and member 10 to the upper repose position in which it is shown in FIG. 1. Pressurization of the upper end of the cylinder 34 by compressed air from a supply line lead 42 via a tube 41 and a manually-operated supply-exhaust control valve device 44 on frame part 36 actuates the piston, piston rod 40 and member 10 downwardly toward member 11. Full travel of piston rod 40 is capable of moving member 10 downwasdly to positions at least near the member 11 for clamping relatively thin workpieces as well as relatively thick ones. A retracted repose position for the member 10 which affords a vertical separation distance of at least several inches, also enables individual workpieces to be placed into proximity with the lower heating coil for heating thereby while manipulating a brazing alloy rod along the workpiece surfaces for "tinning" same, for example. At the same time, such distance enables the clamping and heating of workpieces of considerable thicknesses.

Reactive support for the bottom member 11 is provided by the frame 38 via a lower horizontal part 46.

To enable repetitive downward movements of the member 10 up to its full travel capability without concern for fatigue failure of the power and water leads 25 and 32, these leads consist of a multi-strand copper conductor 50, FIG. 2, encircled by a water-tight tube 51 of resilient material such as rubber, at least for a significant portion of their length.

To afford portability of the device, the frame 38 is provided with a support strap 53 extending upwardly therefrom, which, at its upper end, carries an eye 55 for suspension by a hook 57, which may form a part of a traveling block system, as exemplified in FIG. 5, which includes a cable 59 for the hook 57, a power winch 61 for such cable, a carriage 62 for the winch, an overhead cantilevered rail 63 for the winch carriage, a transverse carriage 64 for rail 63, and rails 65 mounted on a horizontally-extending vertical support or wall 66 for such transverse carriage. Wall-mounted 10 kHz. power, cooling water, and pneumatic conductors 67 parallel with rails 65 provide for plug-in connection for operation of the device at selected locations along the wall or vertical support. A fixed station motor-generator set 68 supplies power to the 10 kHz. distribution lines along the wall.

I claim as my invention:

1. An induction heating device for heating and clamping flat laminate workpiece assemblages, comprising:
    a pair of upper and lower heat and pressure applicator members having respective horizontal workpiece-clamping surfaces facing one another,
    said heat and pressure applicator members including respective water-cooled multi-turn induction heating coils embedded in insulating material and having respective end turns disposed adjacent and parallel to the workpiece clamping surfaces and at least two other respective turns parallel to such end turns,
    a vertically extending fluid pressure cylinder device having a downwardly-extending piston rod affixed at its lower end to the upper heat and pressure applicator member for retraction and advancement thereof toward and away from the lower heat and pressure applicator member,
    a vertically extending rigid frame having vertically-separated horizontal parts affixed to the cylinder device and to the lower heat and pressure applicator member for support and reactive connection therebetween,
    a valve device on said frame for controlling operation of said cylinder device,
    a flexible input power end cooling water lead including a multi-strand electrical conductor connected to one end of the induction heating coil in the upper heat and pressure applicator member,
    a similar flexible lead connecting the opposite end of the upper induction heating coil to one end of the lower induction heating coil,
    and a second input power and cooling water lead connected to the opposite end of the lower induction heating coil,
    the aforesaid induction heating coils being so wound, and the aforesaid leads thereto being so arranged that the two coils are connected in series and when energized create electromagnetic flux lines which project perpendicularly through the work-piece-contacting surfaces of the heat and pressure applicator members and reinforce one another.

2. The induction heating device of claim 1, further comprising a motor-generator set connected to the aforesaid input power leads for high frequency energization of the induction heating coils.

3. The induction heating device of claim 1 further comprising an overhead vertically adjustable support means suspending the aforesaid frame.

4. The induction heating device of claim 3, further comprising:

an overhead horizontal track and carriage means for said vertically adjustable support means, a second elevated track and carriage means extending perpendicular to and supporting the aforesaid overhead horizontal track and carriage means, and high frequency electrical and cooling water conductors disposed parallel to said second elevated track to accommodate plug-in connections for the aforesaid input power and cooling water leads to the induction heating coils.

5. The induction heating apparatus of claim 4, further comprising a fixed location motor-generator set having its output terminals connected to the aforesaid high frequency electrical conductors.

6. The induction heating apparatus of claim 2, wherein said motor-generator set delivers 10 kHz. electrical energy.

7. The induction heating apparatus of claim 6, wherein said motor-generator set has a rated power output capability of at least one hundred kilowatts.

References Cited
UNITED STATES PATENTS

| | | | |
|---|---|---|---|
| 2,284,504 | 5/1942 | Wrighten et al. | 219—9.5 |
| 2,710,901 | 6/1955 | Ireland | 219—10.73 |
| 2,777,929 | 1/1957 | Brennan | 219—9.5 |
| 2,799,759 | 7/1957 | Bland et al. | 219—10.73 X |

JOSEPH V. TRUHE, Primary Examiner

L. H. BENDER, Assistant Examiner

U.S. Cl. X.R.

219—9.5, 10.79